(12) United States Patent
Takahashi et al.

(10) Patent No.: US 11,192,488 B2
(45) Date of Patent: Dec. 7, 2021

(54) RECEPTACLE STORAGE STRUCTURE

(71) Applicant: HONDA MOTOR CO., LTD., Tokyo (JP)

(72) Inventors: Naoki Takahashi, Wako (JP); Shizuo Hosoya, Wako (JP); Takashi Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/809,955

(22) Filed: Mar. 5, 2020

(65) Prior Publication Data
US 2020/0198513 A1 Jun. 25, 2020

Related U.S. Application Data

(63) Continuation of application No. PCT/JP2017/034462, filed on Sep. 25, 2017.

(51) Int. Cl.
*B60N 3/00* (2006.01)
*B60N 3/10* (2006.01)
*B60R 7/04* (2006.01)

(52) U.S. Cl.
CPC .............. *B60N 3/106* (2013.01); *B60R 7/046* (2013.01)

(58) Field of Classification Search
None
See application file for complete search history.

(56) References Cited

U.S. PATENT DOCUMENTS

| | | | | |
|---|---|---|---|---|
| 7,784,843 B2 * | 8/2010 | Lota | ....................... | B60N 3/102 296/24.34 |
| 8,562,065 B2 * | 10/2013 | Langenbacher | ....... | B60N 3/101 296/146.7 |
| 9,114,839 B2 * | 8/2015 | Langenbacher | ........ | B60R 7/046 |
| 9,630,564 B1 * | 4/2017 | Cano | ......................... | B60R 7/04 |
| 2007/0222249 A1 * | 9/2007 | Valentage | ........... | B60R 13/0243 296/39.1 |
| 2007/0290109 A1 | 12/2007 | Ahlburg et al. | | |
| 2019/0092245 A1 * | 3/2019 | Makino | ..................... | B60R 7/02 |

FOREIGN PATENT DOCUMENTS

| | | |
|---|---|---|
| FR | 2925422 A1 | 6/2009 |
| JP | 2005-335480 A | 12/2005 |
| JP | 2016-159880 A | 9/2016 |

OTHER PUBLICATIONS

International Search Report dated Dec. 19, 2017, issued in counterpart International Application No. PCT/JP2017/034462, with English Translation. (2 pages).
Office Action dated Sep. 16, 2021, issued in counterpart CN Application No. 201780094735.7, with English Translation. (14 pages).

\* cited by examiner

*Primary Examiner* — Steven M Marsh
(74) *Attorney, Agent, or Firm* — Westerman, Hattori, Daniels & Adrian, LLP

(57) ABSTRACT

A receptacle storage structure formed in an interior member of a sliding door movable in a front-and-rear direction of a vehicle, includes a bottom wall part and a peripheral wall part forming a storage space with an upward opening. The peripheral wall part includes a displacement wall part forming at least an upper part of a front-side wall part in the front-and-rear direction and displaceable to a front side in the front-and-rear direction. The displacement wall part is tiltable to the front side in the front-and-rear direction.

10 Claims, 9 Drawing Sheets

SECTION II-II

SECTION III-III

RECEPTACLE STORAGE STRUCTURE

CROSS-REFERENCE TO RELATED APPLICATION

This application is a continuation of International Patent Application No. PCT/JP2017/034462 filed on Sep. 25, 2017, the entire disclosures of which is incorporated herein by reference.

BACKGROUND OF THE INVENTION

Technical Field

The present invention relates to a receptacle storage structure that is provided on a vehicle door.

Background Art

Known interior members of a vehicle door include a door trim in which a receptacle storage part such as a drink holder is formed. A lower part of a bottle-type receptacle is stored in the receptacle storage part, and an upper part of the receptacle is exposed (e.g., Japanese Patent Laid-Open No. 2005-335480).

A sliding door opens and closes in the front-and-rear direction of the vehicle. A receptacle storage part provided on the sliding door moves in the front-and-rear direction of the vehicle together with the sliding door. In the case where luggage placed on the seat is wide enough to extend out past the seat, the luggage may interfere with a receptacle that is stored in the receptacle storage part when the sliding door is opened. Due to this interference, an overload acts on the interior member and causes damage to the interior member in some cases.

SUMMARY OF INVENTION

An object of the present invention is to provide a receptacle storage structure that is able to prevent an overload from acting on an interior member via a receptacle when opening a sliding door.

According to an aspect of the present invention, there is provided a receptacle storage structure formed in an interior member of a sliding door movable in a front-and-rear direction of a vehicle, comprising: a bottom wall part and a peripheral wall part forming a storage space with an upward opening, wherein the peripheral wall part includes a displacement wall part forming at least an upper part of a front-side wall part in the front-and-rear direction and displaceable to a front side in the front-and-rear direction, and the displacement wall part is tiltable to the front side in the front-and-rear direction.

Further features of the present invention will become apparent from the following description of exemplary embodiments (with reference to the attached drawings).

DESCRIPTION OF EMBODIMENTS

First Embodiment

Figure 1:
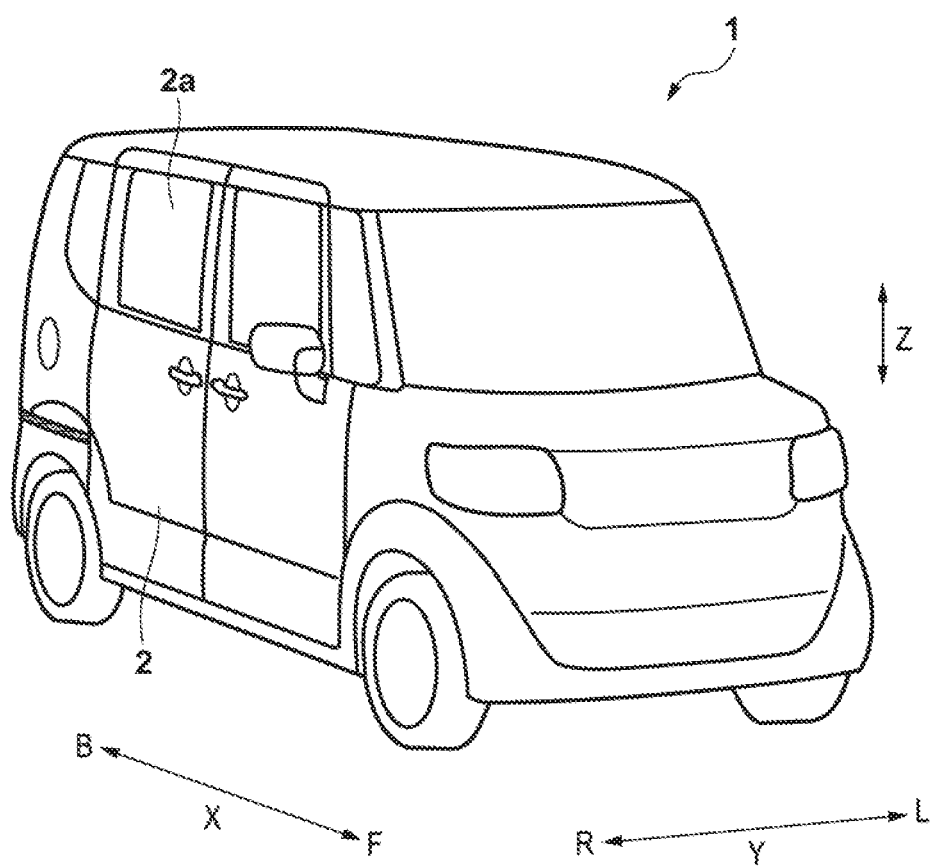
FIG. 1 is an external view showing an example of a vehicle to which the present invention is applicable.

FIG. 1 is an external view showing a vehicle 1 to which the present invention is applicable. The vehicle 1 is a 5-door hatchback passenger car, for example, and, in FIG. 1, front-side and right-side portions thereof are illustrated. A sliding door 2 constitutes a right-side rear door. The sliding door 2 is provided to be movable in the front-and-rear direction, and opens and closes the doorway of a right rear part of the vehicle 1. Although not illustrated, a left-side rear door can also be constituted as a sliding door. In the diagrams, arrow X indicates the front-and-rear direction of the vehicle 1, with F indicating the front side and B indicating the rear side. Arrow Y indicates the vehicle width direction (left-and-right direction) of the vehicle 1, with L indicating the left side and R indicating the right side. Arrow Z indicates the up-and-down direction.

Figure 2:
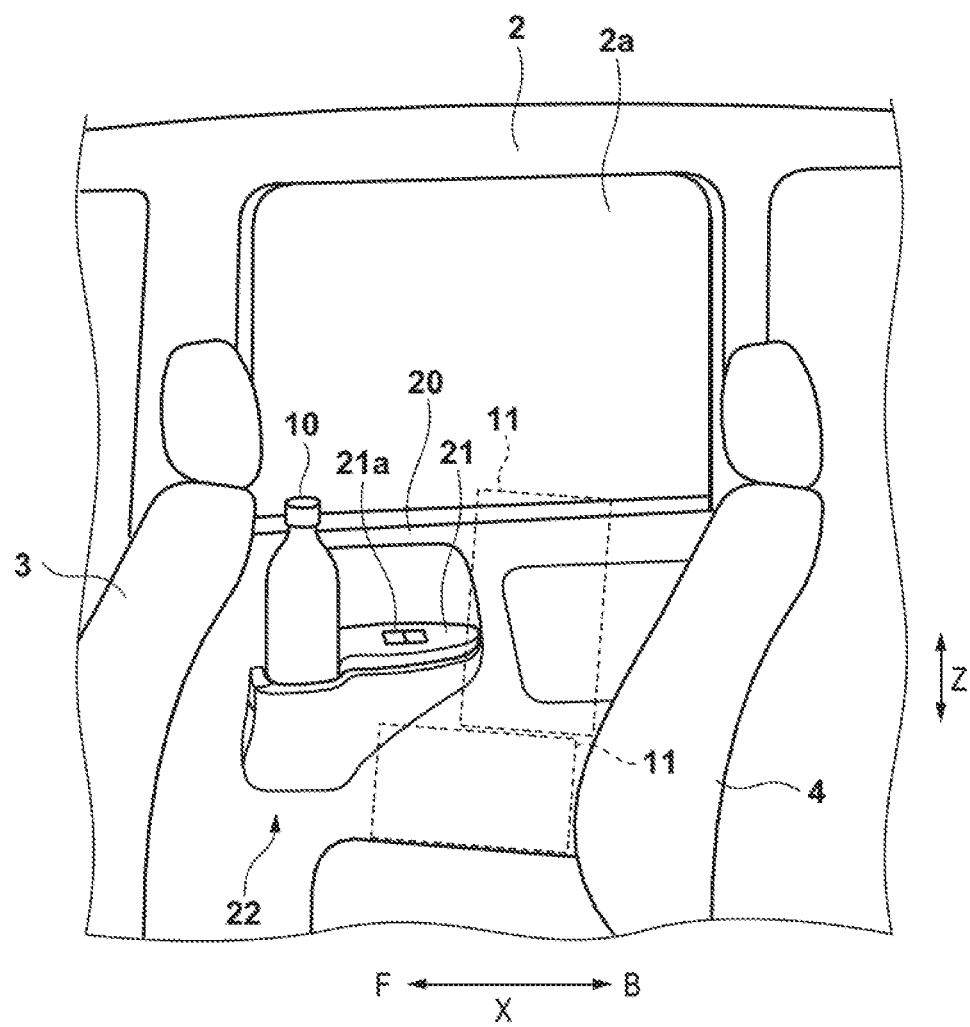
FIG. 2 is a diagram showing an inner side of a sliding door of the vehicle in FIG. 1.

FIG. 2 shows a vehicle interior of the vehicle 1, and views the sliding door 2 from the vehicle inner side. A first row seat 3 and a second row seat 4 are provided in the vehicle interior of the vehicle 1. The sliding door 2 when closed is, with respect to the X direction, disposed between pillars and spans from near a rear part of the seat 3 to near a rear part of the seat 4. The sliding door 2 slides to the rear side in the X direction from the position in FIG. 2, and opens the doorway that is on the right of the seat 4.

The sliding door 2 has a window part 2a in an upper part thereof, and an interior member 20, which is a door trim, is provided in a door main body of a lower part thereof. The interior member 20 is an ornamental member constituting an interior of the vehicle interior. A receptacle storage structure 22 is formed in the interior member 20 so as to bulge toward the vehicle inner side. A switch panel 21 that supports a switch 21a is provided adjoining the receptacle storage structure 22. The switch 21a is a switch for operating a power window that opens and closes a window glass of the window part 2a.

In the example in FIG. 2, a bottle-shaped receptacle 10 is stored in the receptacle storage structure 22. A lower part of the receptacle 10 is supported by the receptacle storage structure 22, and an upper part thereof is exposed. The receptacle 10 is located slightly forward of the seat 4, and is stored in a position that is readily accessible to passengers sifting on the seat 4.

Figure 3:
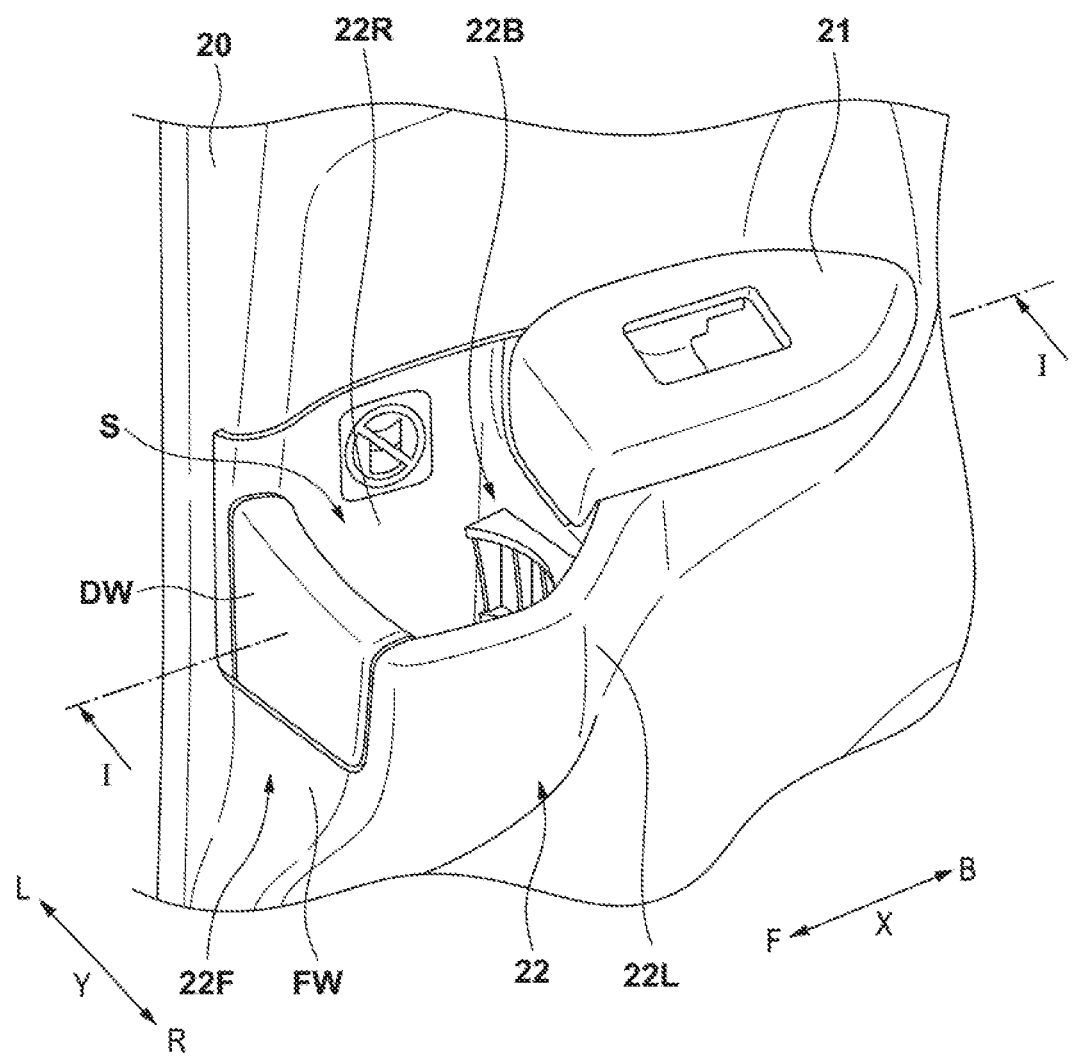
FIG. 3 is a perspective view of a receptacle storage structure according to one embodiment of the present invention.
Figure 4:
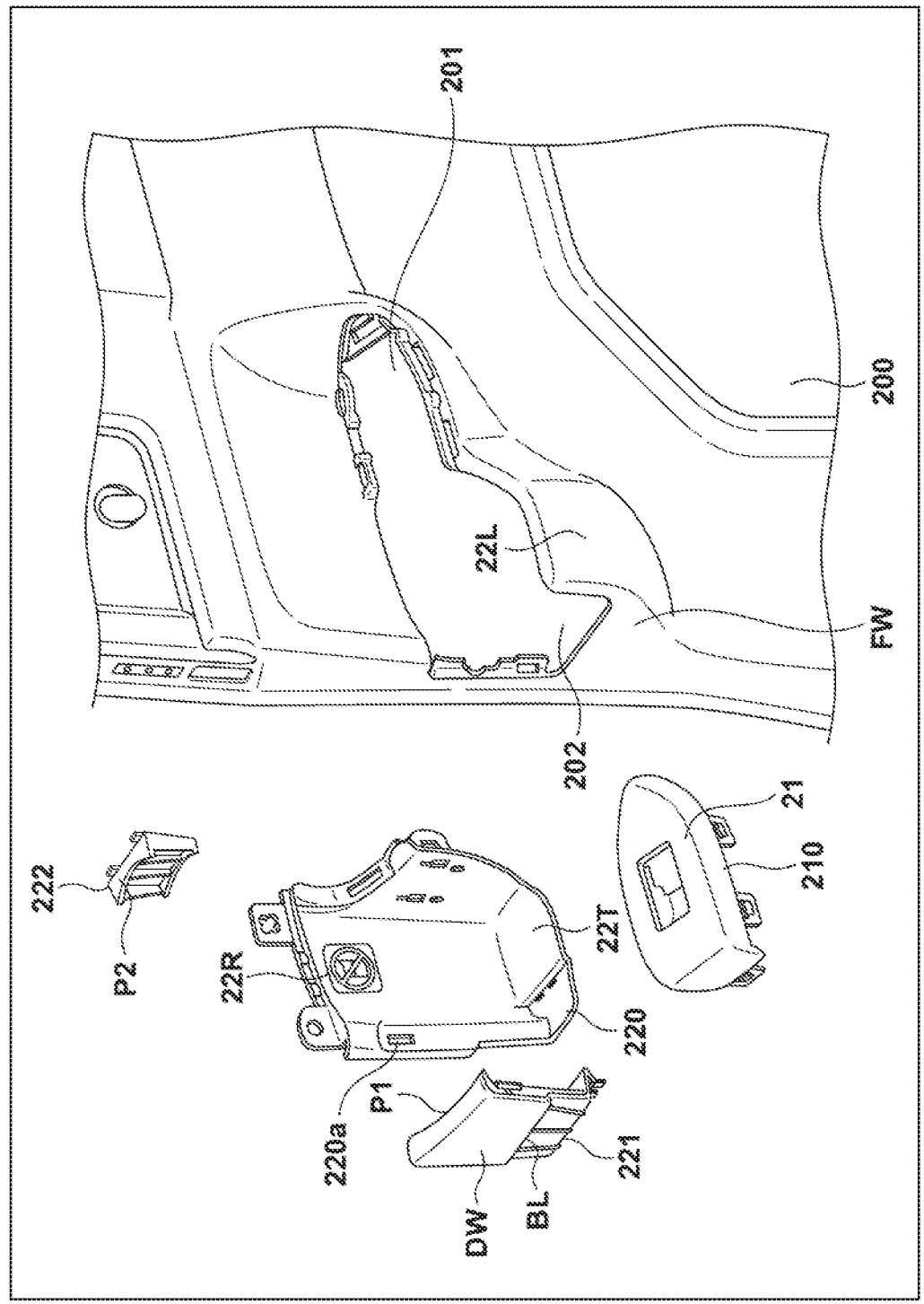
FIG. 4 is an exploded perspective view of the receptacle storage structure in FIG. 3.

FIG. 3 is a perspective diagram of the receptacle storage structure 22, and FIG. 4 is an exploded perspective view thereof. Note that both diagrams show a state in which the switch 21a has been removed.

The receptacle storage structure 22 includes a bottom wall part 22T and peripheral wall parts 22F, 22L, 22R and 22B that form a storage space S with an upward opening. The bottom wall part 22T forms a bottom part of the storage space S. The peripheral wall parts 22F, 22L, 22R and 22B are continuously formed so as to surround the storage space S. The peripheral wall part 22F forms the wall part on the front side of the storage space S. The peripheral wall part 22F may be referred to as a front wall part 22F. The peripheral wall parts 22L and 22R are separated in the Y direction, and form the wall parts on the right and left of the storage space S. The peripheral wall part 22L may be referred to as a left-side wall part 22L and the peripheral wall part 22R may be referred to as a right-side wall part 22R. The peripheral wall part 22B forms the wall part on the rear side of the storage space S. The peripheral wall part 22B may be referred to as a rear wall part 22B.

The receptacle storage structure 22 is constituted by a main body member 200 that forms the main body of the interior member 20, wall part members 220 and 221, and a raised part member 222. The switch panel 21 is formed by a cup-shaped member 210 with a downward opening. The main body member 200 has an opening part 201 that the member 210 is attached to and covers, and, furthermore, an opening part 202 that is continuous with the opening part 201 is formed on the front side of the opening part 201. The wall part members 220 and 221 are attached to the opening part 202, and the opening part 202 is covered by these members.

The wall part member 220 forms the bottom wall part 22T, the right-side wall part 22R, and the rear wall part 22B. The raised part member 222 is attached to the wall part member 220, and forms the rear wall part 22B together with the wall part member 220. The main body member 200 also functions as a wall part member that forms a lower part (fixed wall part FW) of the front wall part 22F and the left-side wall part 22L.

Figure 5:
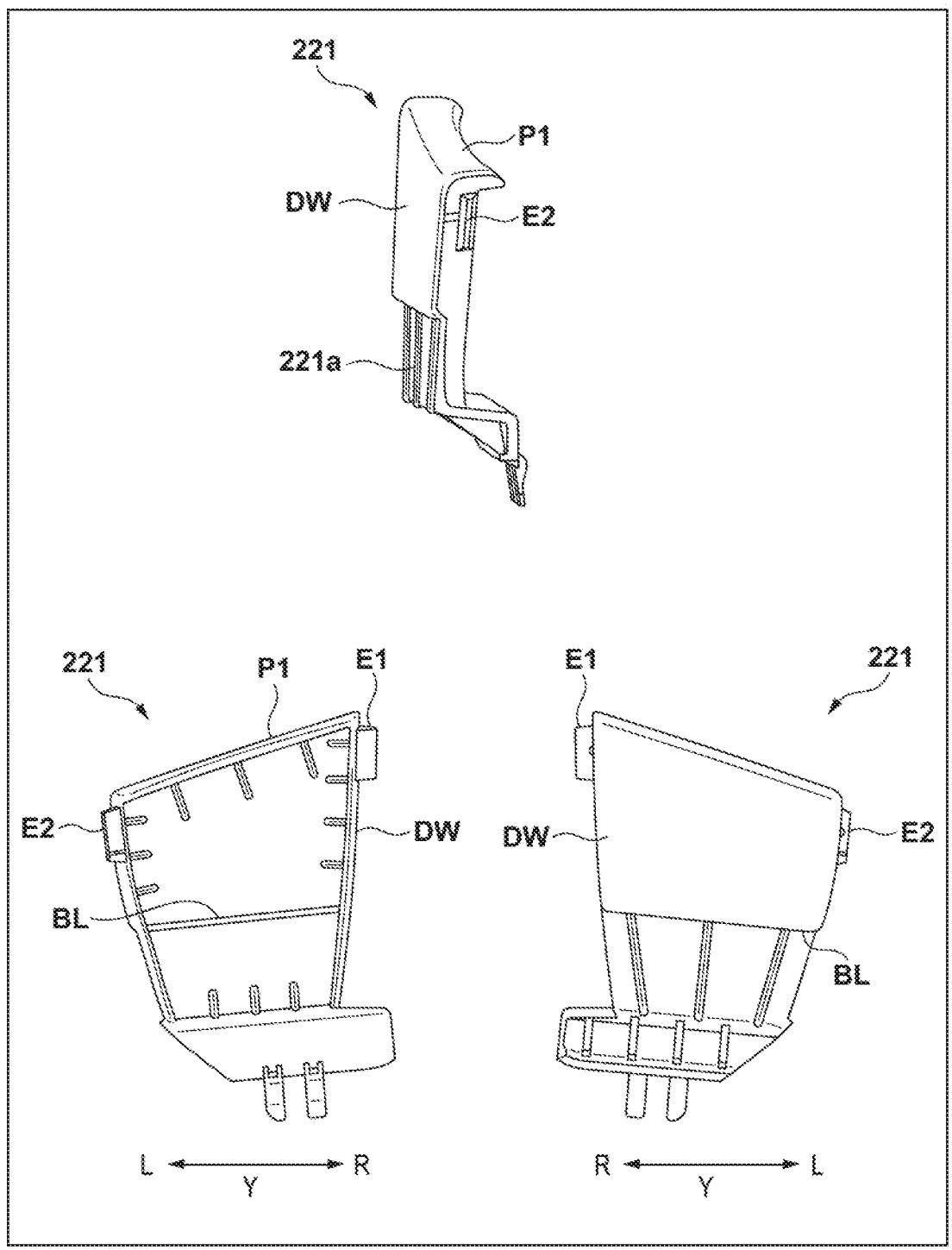
FIG. 5 is a perspective view, a front view and a rear view of a wall part member.
Figure 6:
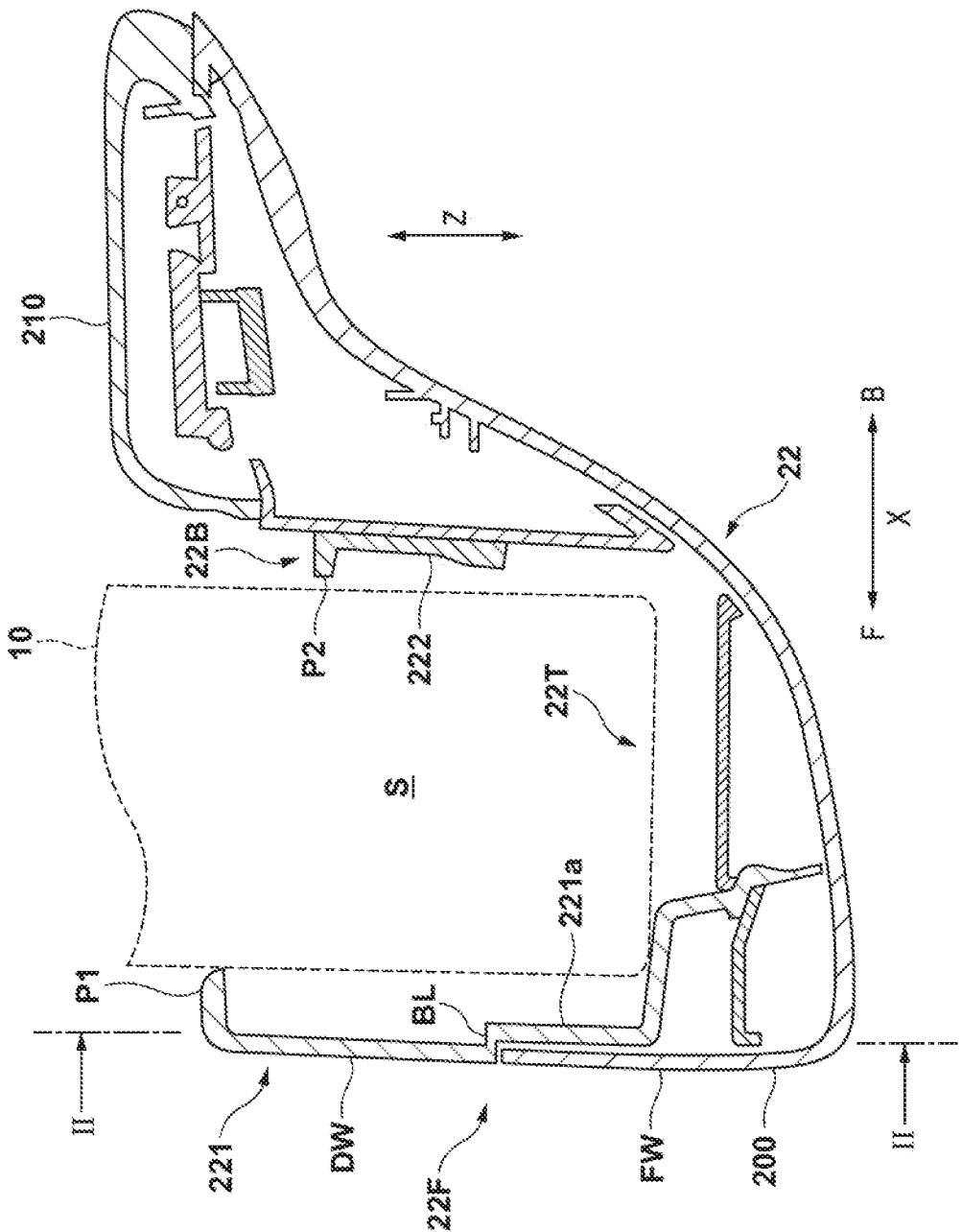
FIG. 6 is a cross-sectional view along line I-I in FIG. 3.
Figure 7:
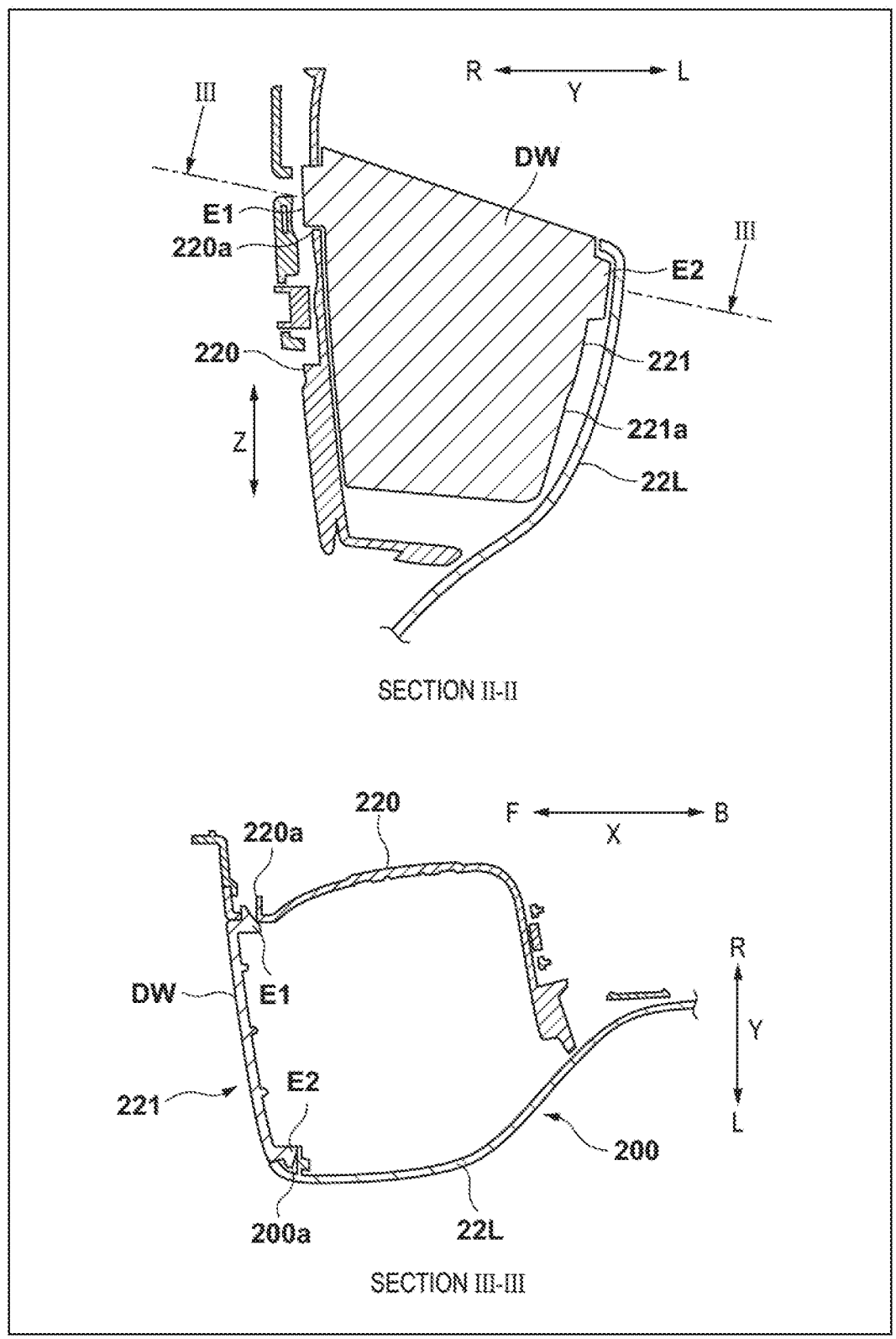
FIG. 7 is a cross-sectional view along line II-II and a cross-sectional view along line in FIG. 6.

The wall part member 221 includes a displacement wall part DW that forms the entire inner wall of the front wall part 22F, and also forms the entire upper part of the front wall part 22F. In the case of the present embodiment, the displacement wall part DW forms only the upper part of the front wall part 22F, but may form the entire front wall part 22F. The wall part member 221 is formed with a material that has flexibility, and the displacement wall part DW is configured to be displaceable to the front side due to member deformation of the wall part member 221. The receptacle storage structure 22 will now be further described focusing on the configuration of the wall part member 221 with reference to FIGS. 5 to 7. FIG. 5 is a perspective diagram, a front view, and a rear view of the wall part member 221. FIG. 6 is a cross-sectional view along line I-I in FIG. 3, and FIG. 7 is a cross-sectional view along line II-II and a cross-sectional view along line in FIG. 6.

The wall part member 221 is a member that is partially bent and tabular throughout, and includes the displacement wall part DW on the upper side and a lower part 221a on the lower side. The lower part 221a is located on the inner side of the main body member 200 in the fixed wall part FW, and a lower end part of the wall part member 221 engages the wall part member 220 such that the lower part 221a overlaps with the main body member 200 in the X direction.

A boundary BL between the displacement wall part DW and the lower part 221a extends in the Y direction at a position of the upper edge of the fixed wall part FW. As shown in FIG. 6, the wall part member 221 is, with respect to the Z direction, bent in a crank-shape at the boundary BL, and is disposed such that a horizontal portion of the boundary BL sits on the upper edge of the fixed wall part FW. The displacement wall part DW and the fixed wall part FW thereby form a continuous surface in which an outer wall surface thereof is substantively without steps in the Z direction, and improve the design.

A raised part P1 projecting horizontally toward the rear side in the X direction is formed on an upper part of the displacement wall part DW. In the case of the present embodiment, the raised part P1 is formed on an upper edge part of the displacement wall part DW. A raised part P2 projecting horizontally on the front side in the X direction is formed on the raised part member 222, so as to oppose the raised part P1. The receptacle 10 that is stored in the storage space S will, depending on the size thereof, be held so as to be sandwiched by the raised part P1 and the raised part P2, in the case of being a regular-sized receptacle such as a PET bottle. The receptacle 10 can thereby be securely stored in the storage space S against vibrations when the vehicle 1 is travelling.

Ear-shaped engaging pieces E1 and E2 projecting in the Y direction are formed on left and right side edges of the displacement wall part DW. The engaging piece E1 projects to the outer side (right side) from the right side edge, and the engaging piece E2 projects to the outer side (left side) from the left side edge. An engaging groove 220a into which the engaging piece E1 is inserted is formed in the wall part member 220. In the case of the present embodiment, the engaging groove 220a is formed as a hole that passes through the wall part member 220. An engaging groove 200a into which the engaging piece E2 is inserted is formed in the main body member 200. In the case of the present embodiment, the engaging groove 200a is formed as a recessed part that is recessed in the inner surface of a formation portion of the left-side wall part 22L of the main body member 200.

In the case of the present embodiment, the two engaging pieces E1 and E2 serve as the attachment sites of the displacement wall part DW, and the left and right side edges of the displacement wall part DW are supported by other members (wall part member 220, main body member 200) at only one portion each. The attachment method thereof is also insertion of the engaging pieces E1 and E2 into the engaging grooves 220a and 200a. Accordingly, the upper part of the displacement wall part DW is fixed in a manner comparatively easily separable. On the other hand, the lower part of the displacement wall part DW is continuous with the lower part 221a of the wall part member 221 at the boundary BL, and is firmly fixed when compared with the upper part.

Next, operation of the receptacle storage structure 22 consisting of the related configuration will be described. Luggage 11 may be placed on the seat 4 as shown in FIG. 2. When the luggage 11 is long in the Y direction or is laid in a manner skewed to the outer side, the luggage 11 may interfere with the receptacle 10 when opening the sliding door 2. Due to this interference, an overload may act on the interior member 20 and damage may be caused to the interior member 20.

Figure 8:
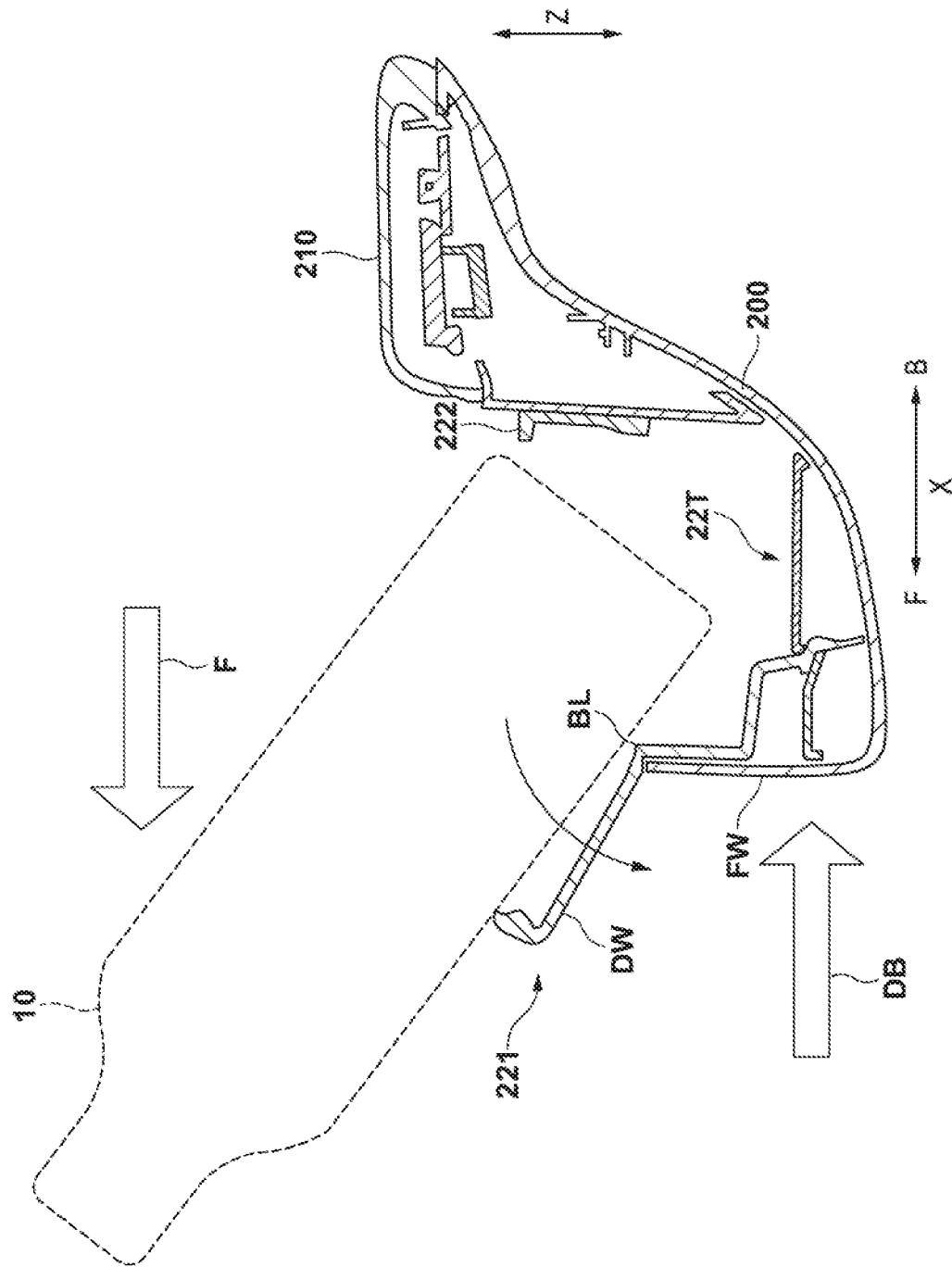
FIG. 8 is an illustrative diagram of operations of the receptacle storage structure in FIG. 3.

In the case of the present embodiment, the displacement wall part DW displaces to the front side, enabling an overload to be prevented from acting on the interior member 20. Specifically, when a load acts in the forward direction on the receptacle 10 in the state of FIG. 6, the displacement wall part DW tilts toward the front side as shown in FIG. 8. In FIG. 8, the case where the luggage 11 interferes with the receptacle 10 and a load F acts on the receptacle 10 in a state where the sliding door 2 is moving rearward as shown with arrow DB is envisaged. The lower part of the wall part member 221 below the boundary BL is restricted from displacing to the front side by the presence of the fixed wall part FW. The engaging pieces E1 and E2 come out from the engaging grooves 220a and 200a and separate from the wall part member 220 and the main body member 200, and the upper part of the displacement wall part DW above the boundary BL tilts so as to rotate to the front side around the boundary BL. The receptacle 10 that transmits the load F to the interior member 20 thereby inclines to the front side or drops out of the storage space S. As a result, an overload is prevented from acting on the interior member 20.

If the load F is no longer acting thereon, the engaging pieces E1 and E2 are inserted into the engaging grooves 220a and 200a, enabling the displacement wall part DW to be restored to the original state, and the receptacle storage structure 22 to again be used for storage of the receptacle 10. Even assuming hypothetically that the displacement wall part DW does not return to the original form and remains tilted to the front side or the wall part member 221 separates from the interior member 20, the fixed wall part FW will remain as the front wall part 22F. Thus, even though the storage space S will become shallower in depth, the receptacle storage structure 22 can continue to be used for storage of the receptacle 10.

In terms of promoting displacement of the displacement wall part DW due to member deformation of the wall part member 221, the wall part member 221 is preferably constituted by a material whose flexibility is greater than the main body member 200 and the wall part member 220 (in other words, a soft material). For example, the main body member 200 and the wall part member 220 can be constituted by polypropylene, and the wall part member 221 can be constituted by an olefin-based elastomer.

Note that, in the case of the present embodiment, in a state where the receptacle 10 is sandwiched between the raised part P1 and the raised part P2 under normal conditions, a slight load toward the front side acts on the raised part P1, that is, the displacement wall part DW as a reaction thereto. However, as shown in FIG. 6, the raised part P2 is positioned lower than the raised part P1 in the height direction, resulting in the receptacle 10 having a tendency that tilts the receptacle 10 backward. Thus, the load toward the front side that acts on the displacement wall part DW can be minimized, and unnecessary displacement of the displacement wall part DW to the front side can be avoided.

Also, in the present embodiment, the right-side sliding door 2 was described, but the present invention is also applicable to a left-side sliding door.

Second Embodiment

Figure 9:
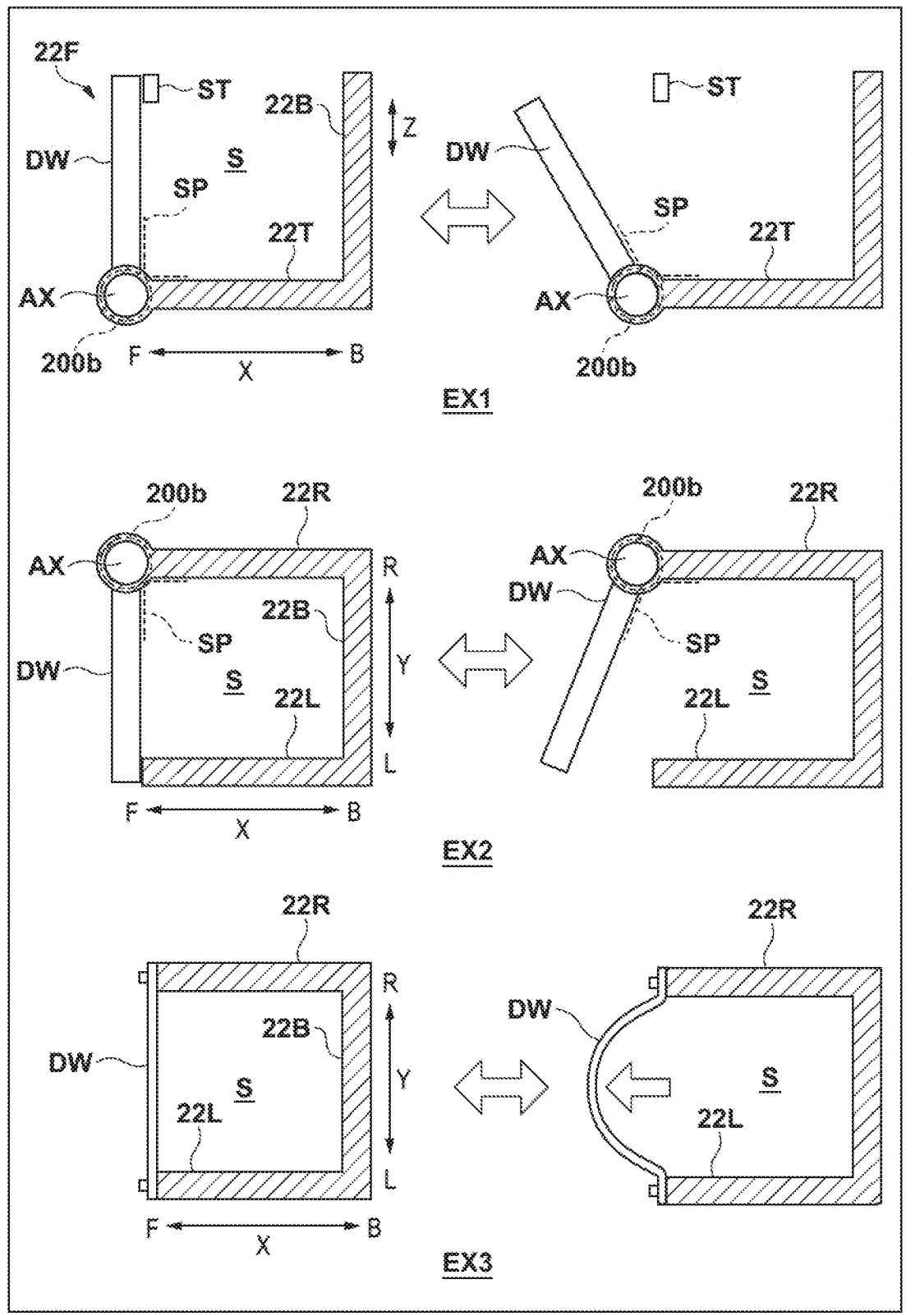
FIG. 9 is an illustrative diagram of other example structures.

In the first embodiment, the displacement wall part DW was displaced due to member deformation of the wall part member 221, but a configuration may be adopted in which the displacement wall part DW is constituted by a movable member and is displaced by the mobility thereof. EX1 in FIG. 9 shows an example thereof. In this example, the displacement wall part DW is constituted as a movable member having an axis AX extending in the Y direction, and rotationally supported by an axle bearing 200b that is formed in the abovementioned wall part member 220 or main body member 200. A coil spring SP is provided in the axis AX. The coil spring SP is disposed so as to apply a rotational tendency that is clockwise in the diagram to the displacement wall part DW. A stopper ST restricts the rotation of the displacement wall part DW. When a load in the forward direction acts on the displacement wall part DW, the displacement wall part DW rotates toward the front side as shown on the right side of the diagram, enabling the load to be released. When the load stops acting, the displacement wall part DW returns to the original position due to the elastic force of the coil spring SP.

The rotation direction of the displacement wall part DW may be the left-and-right direction. EX2 in FIG. 9 shows an example thereof. In the example in the diagram, the axis AX extends in the Z direction, and the axle bearing 200b is formed on the right-side wall part 22R. The left-side wall part 22L functions additionally as a stopper that restricts the rotation range of the displacement wall part DW. When a load in the forward direction acts on the displacement wall part DW, the displacement wall part DW rotates clockwise in the diagram as shown on the right side of the diagram, enabling the load to be released. When the load stops acting, the displacement wall part DW returns to the original position due to the elastic force of the coil spring SP.

As yet another example of the displacement wall part DW, the displacement wall part DW may be constituted by a material that expands and contracts such as rubber. EX3 in FIG. 9 shows an example thereof. In the example in the diagram, the displacement member DW is constituted by rubber, with the left end part thereof being fixed to the left-side wall part 22L and the right end part being fixed to the right-side wall part 22R. When a load in the forward direction acts on the displacement wall part DW, the displacement wall part DW stretches in the forward direction in a U-shape as shown on the right side of the diagram, enabling the load to be released. When the load stops acting, the displacement wall part DW returns to the original form due to the elastic force thereof.

Summary of Embodiments

The above embodiments disclose at least the following structures.

1. A receptacle storage structure (e.g., 22) formed in an interior member (e.g., 20) of a sliding door (e.g., 2) movable in a front-and-rear direction of a vehicle (e.g., 1), including:

a bottom wall part (e.g., 22T) and a peripheral wall part (e.g., 22F, 22L, 22R, 22B) forming a storage space (e.g., S) with an upward opening, wherein the peripheral wall part includes a displacement wall part (e.g., DW) forming at least an upper part of a front-side wall part (e.g., 22F) in the front-and-rear direction and displaceable to a front side in the front-and-rear direction.

According to this embodiment, when a load in the forward direction acts on the displacement wall part, the displacement wall part displaces to the front side. Thus, an overload can be prevented from acting on the interior member via the receptacle, when opening the sliding door.

2. The receptacle storage structure, wherein an upper part of the displacement wall part is fixed in a manner separable from other portions of the peripheral wall part (e.g., E1, E2, 220a, 200a), and a lower part of the displacement wall part is fixed more firmly than the upper part (e.g., 221a).

According to this embodiment, displacement of the displacement wall part by tilting forward can be promoted.

3. The receptacle storage structure, wherein a first raised part (e.g., P1) projecting toward a rear side in the front-and-rear direction is formed on an upper part of the displacement wall part, a second raised part (e.g., P2) projecting toward the front side in the front-and-rear direction is formed on a rear-side wall part of the peripheral wall part in the front-and-rear direction.

According to this embodiment, the receptacle can be more securely held within the storage space during travel.

4. The receptacle storage structure, wherein
wall part members forming the peripheral wall part include a first wall part member (e.g., 200, 220) and a second wall part member (e.g., 201) whose flexibility is greater than the first wall part member,
the second wall part member includes the displacement wall part, and
the displacement wall part displaces due to deformation of the second wall part member, to the front side in the front-and-rear direction.

According to this embodiment, an overload can be prevented from acting on the interior member, by facilitating deformation of the displacement wall part utilizing elastic deformation or plastic deformation of the second wall part member.

5. The receptacle storage structure, wherein the displacement wall part is tiltable to the front side in the front-and-rear direction.

According to this embodiment, the receptacle can be tilted to the front side to enable the load to be released.

6. The receptacle storage structure, wherein the displacement wall part is formed by a movable member (e.g., EX1, EX2) rotatable to the front side in the front-and-rear direction.

According to this embodiment, an overload can be prevented from acting on the interior member by rotation of the movable member.

7. The receptacle storage structure is including:
a flexible member (e.g., 221) forming a front-side inner wall of the storage space in the front-and-rear direction,
wherein the peripheral wall part includes left and right side wall parts (e.g., 22L, 22R) that are separated in a vehicle width direction,
an upper part of the flexible member forms the displacement wall part,
a lower part (e.g., 221a) of the flexible member is fixed in a manner nondisplaceable to the front side in the front-and-rear direction,
an engaging piece (e.g., E1, E2) projecting in the vehicle width direction is formed on each of right and left side edges of the displacement wall part, and
an engaging groove (e.g., 200a, 220a) into which the engaging piece is inserted is formed in each of the right and left side wall parts.

According to this embodiment, fixing of the displacement wall part can be smoothly released with a comparatively simple configuration, and the displacement wall part can be displaced to the front side.

8. The receptacle storage structure, wherein the second raised part is positioned lower than the first raised part in a height direction.

According to this embodiment, the receptacle has a tendency to tilt backward, and unnecessary displacement of the displacement wall part to the front side can be prevented.

The present invention is not restricted to the above embodiments, and various changes and modifications can be made within the spirit and scope of the invention. Therefore, to appraise the public of the scope of the present invention, the following claims are appended.

The invention claimed is:

1. A receptacle storage structure formed in an interior member of a sliding door movable in a front-and-rear direction of a vehicle, comprising:
a bottom wall part and a peripheral wall part forming a storage space with an upward opening,
wherein the peripheral wall part includes a front-side wall part on a front side of the vehicle, a left-side wall part on a left side of the vehicle, and a right-side wall part on a right side of the vehicle,
the front-side wall part includes a displacement wall part forming at least an upper part of the front-side wall part, and
the displacement wall part is able to tilt to the front side of the vehicle in the front-and-rear direction while separating from the left-side wall part and the right-side wall part.

2. The receptacle storage structure according to claim 1, wherein
an upper part of the displacement wall part is fixed in a manner separable from other portions of the peripheral wall part, and
a lower part of the displacement wall part is fixed more firmly than the upper part.

3. The receptacle storage structure according to claim 1, wherein
a first raised part projecting toward a rear side in the front-and-rear direction is formed on an upper part of the displacement wall part,
a second raised part projecting toward the front side in the front-and-rear direction is formed on a rear-side wall part of the peripheral wall part in the front-and-rear direction.

4. The receptacle storage structure according to claim 1, wherein
wall part members forming the peripheral wall part include a first wall part member and a second wall part member whose flexibility is greater than the first wall part member,
the second wall part member includes the displacement wall part, and
the displacement wall part displaces due to deformation of the second wall part member, to the front side in the front-and-rear direction.

5. The receptacle storage structure according to claim 1, wherein the displacement wall part is formed by a movable member rotatable to the front side in the front-and-rear direction.

6. The receptacle storage structure according to claim 1, comprising:
a flexible member forming a front-side inner wall of the storage space in the front-and-rear direction,
wherein
an upper part of the flexible member forms the displacement wall part,
a lower part of the flexible member is fixed in a manner nondisplaceable to the front side in the front-and-rear direction,
an engaging piece projecting in the vehicle width direction is formed on each of right and left side edges of the displacement wall part, and
an engaging groove into which the engaging piece is inserted is formed in each of the right-side wall part and the left-side wall part.

7. The receptacle storage structure according to claim 3, wherein the second raised part is positioned lower than the first raised part in a height direction.

8. The receptacle storage structure according to claim 1, wherein the displacement wall part is able to tilt to the front side of the vehicle at a boundary that is between the displacement wall part and a lower part of the front-side wall part and that extends in a left-and-right direction of the vehicle.

9. The receptacle storage structure according to claim 8, wherein the lower part of the front-side wall part is fixed in a manner nondisplaceable to the front side in the front-and-rear direction.

10. A receptacle storage structure formed in an interior member of a sliding door movable in a front-and-rear direction of a vehicle, comprising:
- a bottom wall part and a peripheral wall part forming a storage space with an upward opening,
- wherein the peripheral wall part includes a displacement wall part forming at least an upper part of a front-side wall part in the front-and-rear direction and displaceable to a front side in the front-and-rear direction, and
- the displacement wall part is tiltable to the front side in the front-and-rear direction,
- wherein the receptacle storage structure further comprises a flexible member forming a front-side inner wall of the storage space in the front-and-rear direction,
- wherein the peripheral wall part includes left and right side wall parts that are separated in a vehicle width direction,
- an upper part of the flexible member forms the displacement wall part,
- a lower part of the flexible member is fixed in a manner nondisplaceable to the front side in the front-and-rear direction,
- an engaging piece projecting in the vehicle width direction is formed on each of right and left side edges of the displacement wall part, and
- an engaging groove into which the engaging piece is inserted is formed in each of the right and left side wall parts.

* * * * *